United States Patent
Davis

(10) Patent No.: US 7,653,594 B2
(45) Date of Patent: Jan. 26, 2010

(54) TARGETED INCENTIVES BASED UPON PREDICTED BEHAVIOR

(75) Inventor: Mark Davis, Clearwater, FL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 1162 days.

(21) Appl. No.: 10/297,914

(22) PCT Filed: Sep. 3, 2002

(86) PCT No.: PCT/US02/25957

§ 371 (c)(1),
(2), (4) Date: Jun. 13, 2003

(87) PCT Pub. No.: WO03/081376

PCT Pub. Date: Oct. 2, 2003

(65) Prior Publication Data

US 2004/0034570 A1    Feb. 19, 2004

Related U.S. Application Data

(60) Provisional application No. 60/365,546, filed on Mar. 20, 2002.

(51) Int. Cl.
*G06Q 40/00* (2006.01)

(52) U.S. Cl. .......................................... 705/39; 705/14

(58) Field of Classification Search .................. 705/14, 705/39, 26, 10, 37, 38, 42, 35, 36 R; 235/380
See application file for complete search history.

(56) References Cited

U.S. PATENT DOCUMENTS

| | | | |
|---|---|---|---|
| 4,961,089 A | 10/1990 | Jamzadeh | |
| 5,774,868 A | 6/1998 | Cragun | |
| 5,832,457 A | 11/1998 | O'Brien et al. | |
| 5,930,764 A | 7/1999 | Melchione | |
| 5,999,914 A | 12/1999 | Blinn | |
| 6,055,513 A * | 4/2000 | Katz et al. | 705/26 |
| 6,073,112 A * | 6/2000 | Geerlings | 705/14 |
| 6,119,099 A | 9/2000 | Walker | |
| 6,334,110 B1 | 12/2001 | Walter et al. | |
| 7,107,225 B1 * | 9/2006 | McClung, III | 705/26 |
| 2001/0014868 A1 | 8/2001 | Herz et al. | |

(Continued)

FOREIGN PATENT DOCUMENTS

JP    2001-175761    6/2001

(Continued)

OTHER PUBLICATIONS

Banker et al. "An Empirical Investigation of an Incentive Plan that Includes Nonfinancial Performance Measures" Jan. 2000, The Accounting Review, vol. 75, No. 1, pp. 65-92.*

(Continued)

*Primary Examiner*—Kelly Campen
(74) *Attorney, Agent, or Firm*—Neifeld IP Law, PC

(57) ABSTRACT

A system and method for anticipating consumer behavior and determining transaction incentives for influencing consumer behavior comprises a computer system and associated database for determining cross time correlations between transaction behavior, for applying the function derived from the correlations to consumer records to predict future consumer behavior, and for deciding on transaction incentives to offer the consumers based upon their predicted behavior.

32 Claims, 6 Drawing Sheets

U.S. PATENT DOCUMENTS

2002/0087384 A1* 7/2002 Neifeld .................. 705/14
2004/0143502 A1* 7/2004 McClung, III .......... 705/14

FOREIGN PATENT DOCUMENTS

| JP | 2001-282982 | 12/2001 |
| JP | 2003-203181 | 7/2003 |
| WO | WO 99/03030 | 1/1999 |
| WO | WO 99/12117 | 3/1999 |
| WO | WO 01/71683 | 9/2001 |
| WO | WO 02/054324 | 7/2002 |

OTHER PUBLICATIONS

Currim et al. "A Taxonomy of Consumer Purchase Strategies in a Promotion Intensive Environment" Spring 1991, Marketing Science, vol. 10, No. 2, pp. 91-110.*

Rhee, Byon-Duk "Consumer Heterogeneity and Strategic Quality Decisions" Feb. 1996, Management Science, Vol. 42, No. 2, pp. 157-172.*

International Search report for International Application No. PCT/US02/25957.

Nov. 13, 2003, PCT ISR for PCT/US02/25957.

Nov. 13, 2003, PCT ISR for PCT/US02/25957.

Oct. 12, 2001, Patent Abstracts of Japan, publication No. 2001-282982.

Jun. 29, 2001, Patent Abstracts of Japan, publication No. 2001-175761.

Jul. 18, 2003, Patent Abstracts of Japan, publication No. 2003-203181.

Aug. 25, 2008, English translation of office action in Japanese patent application 2003-579041, office action drafted Aug. 25, 2008.

Mar. 25, 2009, ESR for EP 02757131.

Nov. 13, 2003, PCT ISR for PCT/US02/25957.

herewith, English translation of office action in Japanese patent application 2003-579041, office action drafted Aug. 25, 2008.

* cited by examiner

Table 1 - Records of transactions of a consumer

| DATE | P1 | P2 | P3 | P4 | P5 | P6 | P7 | P8 | P9 | P10 | P11 | P12 |
|---|---|---|---|---|---|---|---|---|---|---|---|---|
| 1/1/00 | 1 | 0 | 0 | 1 | 0 | 0 | 0 | 3 | 0 | 2 | 0 | 1 |
| 1/13/00 | 0 | 1 | 0 | 0 | 0 | 0 | 3 | 0 | 1 | 0 | 0 | 0 |
| 1/17/00 | 0 | 0 | 0 | 0 | 0 | 0 | 0 | 0 | 0 | 0 | 0 | 1 |
| 2/1/00 | 1 | 0 | 0 | 1 | 0 | 0 | 0 | 1 | 0 | 1 | 0 | 0 |
| 2/17/00 | 0 | 0 | 0 | 0 | 0 | 1 | 0 | 0 | 0 | 0 | 0 | 0 |
| 2/28/00 | 1 | 2 | 0 | 1 | 0 | 0 | 1 | 0 | 1 | 0 | 0 | 1 |
| 3/4/00 | 0 | 0 | 0 | 0 | 1 | 0 | 0 | 0 | 0 | 0 | 0 | 0 |
| 3/12/00 | 0 | 0 | 1 | 0 | 1 | 0 | 0 | 0 | 0 | 0 | 0 | 1 |
| 3/27/00 | 1 | 0 | 0 | 2 | 0 | 0 | 2 | 0 | 1 | 0 | 0 | 1 |
| 4/10/00 | 0 | 2 | 0 | 1 | 0 | 1 | 0 | 0 | 1 | 0 | 0 | 0 |
| 5/1/00 | 0 | 0 | 0 | 1 | 0 | 0 | 0 | 0 | 0 | 0 | 0 | 0 |
| 5/7/00 | 1 | 1 | 0 | 2 | 0 | 0 | 1 | 0 | 1 | 0 | 0 | 2 |
| 5/19/00 | 1 | 0 | 0 | 0 | 0 | 1 | 0 | 0 | 1 | 0 | 0 | 0 |

FIG. 7

Table 2 - Purchases of consumer of table 1, cumulated by month

| DATE | P1 | P2 | P3 | P4 | P5 | P6 | P7 | P8 | P9 | P10 | P11 | P12 |
|---|---|---|---|---|---|---|---|---|---|---|---|---|
| 1/00 | 1 | 1 | 0 | 1 | 0 | 0 | 3 | 3 | 1 | 2 | 0 | 2 |
| 2/00 | 2 | 2 | 0 | 2 | 0 | 1 | 1 | 1 | 1 | 1 | 0 | 1 |
| 3/00 | 1 | 0 | 1 | 2 | 2 | 0 | 2 | 0 | 1 | 0 | 0 | 2 |
| 4/00 | 0 | 2 | 0 | 1 | 0 | 1 | 0 | 0 | 1 | 0 | 0 | 0 |
| 5/00 | 2 | 1 | 0 | 3 | 0 | 1 | 1 | 0 | 2 | 0 | 0 | 2 |

FIG. 8

Table 3 - fraction of records having a non-zero value (uncorrelated)

| DATE | P1 | P2 | P3 | P4 | P5 | P6 | P7 | P8 | P9 | P10 | P11 | P12 |
|---|---|---|---|---|---|---|---|---|---|---|---|---|
| 1/00 | 0.4 | 0.2 | 0.3 | 0.7 | 0.6 | 0.1 | 0.3 | 0.3 | 0.1 | 0.2 | 0.2 | 0.3 |
| 2/00 | 0.5 | 0.4 | 0.5 | 0.7 | 0.8 | 0.2 | 0.5 | 0.5 | 0.1 | 0.3 | 0.5 | 0.5 |
| 3/00 | 0.5 | 0.5 | 0.4 | 0.7 | 0.7 | 0.1 | 0.5 | 0.5 | 0.2 | 0.2 | 0.4 | 0.4 |
| 4/00 | 0.4 | 0.5 | 0.5 | 0.4 | 0.7 | 0.2 | 0.5 | 0.4 | 0.1 | 0.2 | 0.4 | 0.5 |
| 5/00 |  |  |  |  |  |  |  |  |  |  |  | .3 |

FIG. 9

Table 4 - fraction of consumer records having a non-zero value (correlated)

| DATE | P1 | P2 | P3 | P4 | P5 | P6 | P7 | P8 | P9 | P10 | P11 | P12 |
|---|---|---|---|---|---|---|---|---|---|---|---|---|
| 1/00 | 0.4 | 0.2 | 0.3 | 0.7 | 0.6 | 0.1 | 0.3 | 0.3 | 0.1 | 0.2 | 0.2 | 0.3 |
| 2/00 | 0.5 | 0.4 | 0.5 | 0.7 | 0.8 | 0.2 | 0.5 | 0.5 | 0.1 | 0.3 | 0.5 | 0.5 |
| 3/00 | 0.6 | 0.5 | 0.4 | 0.8 | 0.9 | 0.1 | 0.5 | 0.4 | 0.2 | 0.2 | 0.2 | 0.6 |
| 4/00 | 0.6 | 0.6 | 0.5 | 0.8 | 0.7 | 0.2 | 0.5 | 0.2 | 0.1 | 0.2 | 0.1 | 0.4 |
| 5/00 |  |  |  |  |  |  |  |  |  |  |  | 1 |

FIG. 10

Table 5 - Difference between tables 3 and 4

| DATE | P1 | P2 | P3 | P4 | P5 | P6 | P7 | P8 | P9 | P10 | P11 | P12 |
|---|---|---|---|---|---|---|---|---|---|---|---|---|
| 1/00 | 0 | 0 | 0 | 0 | 0 | 0 | 0 | 0 | 0 | 0 | 0 | 0 |
| 2/00 | 0 | 0 | 0 | 0 | 0 | 0 | 0 | 0 | 0 | 0 | 0 | 0 |
| 3/00 | 0.1 | 0 | 0.1 | 0.2 | 0 | 0 | 0 | -0.1 | 0 | 0 | -0.2 | 0.2 |
| 4/00 | 0.2 | 0.1 | 0 | 0.4 | 0 | 0 | 0 | -0.2 | 0 | 0 | -0.3 | -0.1 |

FIG. 11

TARGETED INCENTIVES BASED UPON PREDICTED BEHAVIOR

CROSS REFERENCE TO RELATED APPLICATIONS

This application claims priority to U.S. provisional application Ser. No. 60/365,546, filed Mar. 20, 2002, and the contents of that application are incorporated herein by reference.

BACKGROUND OF THE INVENTION

1. Field of the Invention

The invention relates to the field of marketing. More particularly, the invention relates to targeted marketing.

2. Discussion of the Background

Marketing means communicating information regarding at least one of products and services to consumers.

Targeted marketing means selectively marketing to a limited number of consumers, such as an individual, members of a family, persons with the same residence as one another, or persons having some other piece of relevant information in common with one another. U.S. Pat. No. 5,832,457 to O'Brien discloses targeted marketing.

Value means a good, a service, or a pecuniary interest including cash, check, credit, and conditional credit.

Transaction, in this application, means an exchange involving at least two parties. A purchase is a transaction. Receipt of an incentive offer (such as the act of downloading an incentive offer from a web site), redemption of an incentive offer, and acceptance of participation in a consumer survey are transactions.

Purchase, in this application, means a transaction in which cash, check, charge, or credit is exchanged for one or more goods and services.

Transaction incentive, in this application, means an offer for a certain value in exchange for entering into a specified transaction.

Purchase incentive, in this application, means an incentive wherein the specified transaction for which the incentive is offered is a purchase.

Incentive, in this application, means the certain value associated with entering into a transaction specified in a transaction incentive.

Incentive terms and transaction incentive terms, in this application, each means the specifications of the transaction into which someone must enter to be entitled to the incentive associated with the transaction incentive.

Predictive modeling is disclosed in U.S. Pat. No. 4,961,089 to Jamzadeh. Predictive modeling in this application means using data corresponding to prior events to determine a probability of occurrence of an event during some time period in the future. An example of a predictive model would be a formula whose inputs are the number of sun spots recorded over each of the last several years and whose output was a probability of a number of sunspots in the next year falling within a specified range.

A prediction, in this application, means an assumption that one or more events, such as a transaction or a purchase, either are probable to occur or are not probable to occur.

A class, in this application, means a set of things that share a common attribute. An example of a class is the class of all things that are goods. Goods are items of merchandise for sale. Another example of a class is the class of goods that are packaged goods. Another example of a class is the class of packaged goods that are canned goods. Another example of a class is the class of all products that are sold under the same brand name or trademark. Another example of a class is the class of all products that are manufactured by the same manufacturer. Another example of a class is the class of all goods that are diet related. Another example of a class is the class of all goods-that are prescription drugs. Another example of a class is the class of all products that are breakfast products. Another example of a class is the class of all service reservations that are rooming reservations, such as reservations at hotels and motels. Another example of a class is the class of all services reservations that are transportation reservations, including car, bus, train, and airline reservations. A class may consist of items of a single product, such as items having the same Universal Product Code ("UPC"). For example, all product items having the UPC code associated with 12 ounce glass bottles of Coca Cola define a class.

A database is a collection of data. Typically a database is organized in some fashion so that information contained in the data may be readily accessed. In this application the term database means data organized in some format in a computer memory that can be accessed by an associated computer system. Such a concept is also referred to as a database management system. A database or database management system includes commercial database products implemented in a computer system, such as the Microsoft Access and SQL Server line of products as well as any set of files stored in computer memory that can be accessed by an associated computer system.

Designated, as used in the foregoing example, refers to an association of the data defining the good or service with data defining an attribute. All data defining products and services associated with the same attribute are deemed to be in the same class defined by that attribute.

Data defining a good or a service may be stored in a database. Such data may be designated as a member of a class.

DISCLOSURE OF THE INVENTION

Objects of the Invention

It is an object of the invention to provide to a consumer targeted incentives based upon a prediction whether the consumer will enter into a transaction.

Generally speaking, it is an object of the invention to identify transaction patterns of a set of consumers in an earlier time period that correlate to specified purchases by those consumers in later time periods.

More specifically, it is an object of the invention to identify transaction patterns of a set of consumers in one or more earlier first time periods that correlate to purchases by those consumers of one or more products and services within specified product and service classes in one or more later second time periods after the one or more earlier first time periods.

Generally speaking, it is an object of the invention to identify transaction patterns of consumers in a first time period that correlate to changes in rate or amount of purchases within a specific product or service class between the earlier first time period and the later second time period.

More specifically, it is an object of the invention to identify transaction patterns of a set of, consumers in one or more earlier first time periods that correlate to changes in purchases by those consumers of one or more products and services within specified product and service classes between the one or more earlier first time periods and one or more later second time periods after the one or more earlier first time periods.

It is a further object of the invention to base a decision whether to offer a consumer a transaction incentive, such as a purchase incentive for a specified purchase within a certain product or service class, upon the existence of the foregoing transaction patterns in the transaction history records of the consumer that correlate to that certain product or service class.

It is a still further object of this invention to determine from the foregoing correlations a probability or a prediction that the specified consumer will purchase an item within a class of products or services.

It is still a further object of the invention to use the foregoing probability or prediction that the specified consumer will or will not enter into a purchase transaction for an item within a class of products or services as a factor in deciding what if any purchase incentives to offer to that specified consumer.

It is a still further object of this invention to determine from the foregoing correlations relative likelihoods, for each member of a set of consumers, that the consumer will purchase an item within a class of products or services, and to use that ranking in deciding which consumers to target market.

It is another object of this invention to perform targeted marketing by depending offering to a consumer a transaction incentive upon a probability that offering the incentive will change the consumer's purchase behavior for purchase of an item specified in the purchase incentive.

It is another object of this invention to perform targeted marketing by depending the value of a purchase incentive, the preconditions for the consumer to obtain the purchase incentive, or both, upon a quantitative determined probability or prediction of the consumer entering into a purchase transaction.

It is another object of the invention to perform targeted marketing so as to maximize the expected return (either gross profit or net profit) to the seller or manufacturer of an item of a product or service based upon the cost of the incentive to the seller or manufacturer and a predicted probability of changing the consumer's purchase behavior.

It is also a general object of the invention to minimize the cost associated with targeted marketing campaigns by increasing the redemption rate of incentive offers.

SUMMARY OF THE INVENTION

These and other objects of the invention are provided by a novel computer system programmed or designed to analyze consumer specific data including historical consumer transaction data to identify statistical correlations (correlation data) between transactions in classes in different time periods.

The same or a different computer system may use the correlation data in combination with consumer transaction data for a consumer to rank or estimate probability of that consumer entering into a transaction in a specified class in a specified future time period.

The same or a different computer system may also be programmed to apply the rankings or probabilities to transaction incentive criteria to determine whether to offer a transaction incentive associated with the criteria to a consumer having the ranking or probability. The computer system may determine the mechanism for making the offer of a transaction incentive, the timing of making the offer of a transaction incentive, the value associated with the offer of a transaction incentive, the class or classes of transactions into which the consumer must enter in order to receive the incentive.

The method of the invention provides predictions of future transactions for a consumer that are based upon applying a specified consumer's transaction to one or more mathematical formula that define a likelihood of a consumer entering into one or more transactions, and wherein the mathematical formula incorporates correlation data obtained by statistical analysis of transaction data for a set of consumers over a time period.

The correlations resulting from consumer transaction data may be combined with correlations to consumer purchase preferences from other sources, such as correlations from demographic data and customer loyalty quotients. The correlations of a particular customer to these types of data may be incorporated into a ranking or probability function in predicting the likelihood of a consumer entering into a specified transaction in a specified future time period.

Some of the types of consumer behavior that may be predicted are changes in transaction behavior. For example the predictions may be that certain consumers will be purchasing more or less in a specified class, switching brands in the same product class, purchasing larger or smaller values or quantities in a particular class, purchasing a particular brand in a class when the consumer had not recently purchased in that class, or not purchasing in a class the consumer previously purchased in (referred to herein as lapsing).

The particular class may be products and services associated with any one or more designations. Some examples of classes of goods are fresh meat, canned goods, baking goods, diet foods, breads, cereals, coffees, dairy products, alcoholic beverages, beers, wines, and liquors. More examples of classes are a specified brand of a type of product, such as Kleenex brand tissues, Welch's brand grape juice. More examples of classes are a brand, per se, such as Kelloggs, and Green Giant. A class also includes a group of brands, such as Keebler brands. Examples of classes include products, such as Green Giant eight ounce canned corn and Aunt Jemima one pound pancake mix. The particular class may be a group of products having a feature in common, such as lower fat products, organic products, or products of one or more brands known to be relatively low or relatively high priced.

The consumer transaction data may include data that are measures of any of the following: purchases of a consumer (including transaction class data and transaction date data), incentive redemptions by a consumer, reservations of a consumer, modality of offering transaction incentives that were redeemed by a consumer, frequency of transaction, dollar volume of transaction, item count of purchase, frequency of redemption, value of redeemable incentive, and relative amount of incentives redeemed in different classes. Preferably, all transaction data includes a date or a date range associated with each transaction.

The non-transactional data may include demographics, such as information involving family size, number and age of children, age, and household income bracket. The non-transactional data may also include personal preferences data provided by the consumer.

Customer loyalty quotient data is data indicating the fraction a customer's expenses in classes sold at a specified retail store or chain of retail stores that the customer actually purchases at that retail store or in the same chain of retail stores.

The method of the invention preferably uses transaction data from a plurality of distinct classes in determining correlations to a ranking or a probability of a consumer transaction in a specified class.

In certain instances, formula providing predictions of a consumer entering into a transaction in a specified class do not depend upon consumer transaction data from that class, but only from consumer transaction data for transactions from other distinct classes. This is particularly true when the formula is for a prediction that a consumer's purchases in a specified class will lapse or that the consumer will purchase in a class in which the consumer either has not previously purchased or has not purchased in a very long period of time, such as 2 months, 4 months, or 6 months.

The results of the ranking, probabilities, and predictions may be used as the basis of generating two generically different types of marketing. One type of marketing provides a transaction incentive that does not attempt to change the consumer's predicted transaction behavior. For example, a transaction incentive for purchasing in a class offered in response to a prediction that the consumer's purchasing in that class will lapse attempts to change predicted behavior. A second type of marketing does not provide an incentive to modify the consumer's predicted transaction behavior. For example, a transaction incentive for purchasing a brand in a class when there is a prediction that the consumer will purchase in that class does not attempt to change predicted behavior. In addition, a subgeneric type of marketing does not attempt to change the consumer's predicted purchase behavior as to a genus class but does provide an incentive for the consumer to change predicted transaction behavior in a species class of the genus. For example, a transaction incentive to purchase a second product brand in a specified class when there is a prediction that the consumer will purchase a first product brand in the specified class attempt to change predicted behavior as to the species class but not the genus.

Data as to probability of a consumer redeeming a transaction incentive depending upon the modality of the offer may be used to determine whether to provide a transaction offer derived by using the method of the invention via a point of sale (POS) coupon, email, postal mail, set top box, or personal web site, and data as to the correlated time period in which the prediction indicates consumer transaction behavior may be used to time the delivery of the transaction offer to the consumer.

In one aspect, the invention provides a system and method for anticipating consumer behavior and determining transaction incentives for influencing consumer behavior comprising a computer system and associated database for determining cross time correlations between transaction behavior, for applying a function derived from the correlations to consumer records to predict future consumer behavior, and for deciding which transaction incentives to offer the consumers based upon their predicted behavior.

In another aspect, the invention provides a system and method of its use comprising a database, a computer system having read and write access to said database; and wherein the database stores a plurality of consumer records including a first consumer record for a first consumer, wherein said first consumer record stores (1) CID data (consumer identification data) indicating a first consumer CID for said first consumer; in association with said first consumer CID, at least (2) transaction data in a first transaction class field indicating items transacted by said first consumer in a first transaction class during a first prior time period and (3) predictive data in a first predictive field indicating at least one of a ranking, a probability, and a prediction that said first consumer will transact in a first correlated class during a correlated time period, and wherein said correlated time period is subsequent in time to said prior time period, In additional aspects, said first class and said second class define the same class; said first class defines a different class than said second class; said first class is distinct from said second class; said first class is a genus and said second class is a species of said genus; said first class defines a species of a genus and said second class defines said genus; said database stores, in association with said first consumer CID, transaction data in a second transaction class field indicating items transacted by said consumer in a second transaction class during said first prior time period; said database stores, in association with said first consumer CID, transaction data in a third transaction class field indicating items transacted by said consumer in a third transaction class during said first prior time period; said database stores, in association with said first consumer CID, transaction data in a fourth transaction class field indicating items transacted by said consumer in a fourth transaction class during said first prior time period; said database stores, in association with said first consumer CID, transaction data in a fifth transaction class field indicating items transacted by said consumer in a fifth transaction class during said second prior time period; said database stores, in association with said first consumer CID, transaction data in a sixth transaction class field indicating items transacted by said consumer in a sixth transaction class during said second prior time period; said database stores, in association with said first consumer CID, transaction data in a seventh transaction class field indicating items transacted by said consumer in a seventh transaction class during said second prior time period; said database stores, in association with said first consumer CID, transaction data in an eighth transaction class field indicating items transacted by said consumer in an eighth transaction class during said second prior time period; the system is programmed to decide whether to offer a transaction incentive to said first consumer based upon said predictive data in said first predictive field for said first consumer; a term of said transaction incentive is purchase in said first correlated class; a term of said transaction incentive is purchase of a specified quantity in said first correlated class; a term of said transaction incentive is purchase of a specified brand in said first correlated class; wherein terms of said transaction incentive are purchase in said first correlated class during said correlated time period; wherein a term of said transaction incentive is purchase in a class other than said first correlated class; wherein a term of said transaction incentive is purchase of a specified brand not in said first correlated class; wherein terms of said transaction incentive are purchases in a class other than said first correlated class during said correlated time period; a terminal for presenting said transaction incentive to said first consumer; a printer for printing said terms of transaction incentive; said printer is at a POS terminal; said printer is at a Kiosk; said printer is at a consumer's computer; deciding whether to offer a transaction incentive to said first consumer based upon said predictive data in said first predictive field for said first consumer; printing said transaction incentive; and printing in the presence of said consumer.

In another aspect, the invention comprises a system and method for, in a set of customer records containing transaction data, correlating transactions in a first set of input classes in a first time period to transactions in a first correlated class in a second time period, wherein the second time period is subsequent to said first time period, thereby defining correlation data for said first set of classes; and deciding whether to issue a transaction incentive to a customer based at least in part upon transaction data for said customer in said first set of classes and said correlation data for said first set of classes. Additional aspects of the invention comprise correlating transactions in a second set of classes in said first time period to transactions in a second correlated class in said second time period, thereby defining correlation data for said second set of classes; and deciding whether to issue a transaction incentive to a customer based at least in part upon (1) transaction data for said customer in said first set of classes and said correlation data for said first set of classes and (2) transaction data for said customer in said second set of classes and said correlation data for said second set of classes; correlating transactions in a second set of classes in a second time period to transactions in a second correlated class in said second time period, thereby defining correlation data for said second set of classes; and deciding whether to issue a transaction incentive to a customer based at least in part upon (1) transaction data for said customer in said first set of classes and said correlation data for said first set of classes and (2) transaction data for said customer in said second set of classes and said correlation data for said second set of classes; a term of said transaction incentive is purchasing in said first correlated class; a term of said transaction incentive is purchasing a specified brand in said second correlated class; said transaction incentive is a transaction incentive for transacting in that one of said first correlated class and said second correlated class having correlated data with higher values; said deciding comprising determining whether said transaction data for said customer contains data indicating said customer transacted in at least one class of said first set having a relatively high correlation values compared to other classes of said first set; said at least one class comprises at least two classes; said at least one class comprises at least three classes; said at least one class comprises at least four classes; said deciding occurs while said customer is participating in a transaction at a POS terminal; offering said transaction incentive to said customer while said customer is participating in said transaction and at said POS terminal; said deciding occurs between transactions of said customer; mailing or e-mailing said transaction incentive to said customer; offering said transaction incentive to said customer when said customer is identified at a terminal; said terminal is a POS terminal; said terminal is a kiosk; said deciding whether to issue a transaction incentive is based at least in part upon non transaction data for said consumer; said non transaction data comprises demographic data; said non transaction data comprises loyalty quotient data; and said deciding whether to issue a transaction incentive is based at least in part upon block data. CID block data is statistical data associated with customers in a local neighborhood region.

In yet another aspect, the invention provides a system and method comprising means for, in a set of customer records containing transaction data, correlating transactions in a first set of input classes in a first time period to transactions in a first correlated class in a second time period, wherein the second time period is subsequent to said first time period, thereby defining correlation data for said first set of classes; and means for deciding whether to issue a transaction incentive to a customer based at least in part upon transaction data for said customer in said first set of classes and said correlation data for said first set of classes.

In yet another aspect, the invention provides a system and method comprising means for, in a set of customer records containing transaction data, correlating transactions in a first set of input classes in a first time period to a change in transactions in a first correlated class between said first time period and a second time period, wherein the second time period is subsequent to said first time period, thereby defining correlation data for said first set of classes; and deciding whether to issue a transaction incentive to a customer based at least in part upon transaction data for said customer in said first set of classes and said correlation data for said first set of classes. Additional aspects of the invention include correlating transactions in a second set of classes in said first time period to a change in transactions in a second correlated class between said first time period and said second time period, thereby defining correlation data for said second set of classes; and deciding whether to issue a transaction incentive to a customer based at least in part upon (1) transaction data for said customer in said first set of classes and said correlation data for said first set of classes and (2) transaction data for said customer in said second set of classes and said correlation data for said second set of classes.

In yet another aspect, the invention provides a system and method comprising means for (1) anticipating a consumer's behavior for purchasing a first product based at least in part upon at least a portion of that part of said consumer's transaction history including said consumer's transactions for products other than for purchase of said first product; and (2) basing an incentive determination upon said anticipating.

In yet another aspect, the invention provides a system and method comprising means for (1) anticipating a consumer's behavior for purchasing a first product based at least in part upon at least a portion of that part of said consumer's transaction history including said consumer's transactions for purchases of at least one product other than said first product; and (2) basing an incentive determination upon said anticipating. Additional aspects of the invention comprise that said incentive determination is based at least in part upon differences between said consumer's anticipated and prior purchase behavior for said product; said differences are based at least in part upon variations in frequency of purchase; said differences are based at least in part upon variations in quantity of purchase; said differences are based at least in part upon variations in utilization of prior incentive for purchase; said differences are based at least in part upon variations in brand loyalty; said anticipating is based at least in part upon analysis of data in consumer records; and said anticipating is based at least in part upon a model of consumer transaction behavior.

In yet another aspect, the invention provides a system and method comprising receiving transaction data at a POS terminal in a retailer computer system; transmitting said transaction data over a communications network to a central computer system; storing said transaction data in a database to which said central computer system has read and write access;

(2) analyzing consumer transaction data stored in said database; (3) determining transaction incentives to offer to consumers associated with said transaction data; wherein said central computer system is programmed to employ predictive modeling on said transaction data to determine a predictive modeling function, to determine at least one of rankings, probabilities, and predictions of future consumer transactions by applying consumer transaction data to said predictive modeling function, and determining transaction incentives based upon said at least one of rankings, probabilities, and predictions. Additional aspects of the invention comprise determining timing and method of transmission of said transaction incentives that will most likely result in said transaction incentives being redeemed; and transmitting said transaction incentive over said communication network to said retailer computer system.

BRIEF DESCRIPTION OF THE FIGURES

The invention is better illustrated in connection with the following figures.

FIG. 7 is a table illustrating a consumer record;

FIG. 8 is a table illustrating a consumer record with purchases accumulated by month;

FIG. 9 is a table illustrating cells containing fractions representing the average for that cell in a set of records;

FIG. 10 is a table illustrating cells containing fractions representing the averages for that cell in a set of records wherein all records have a certain value in the cell in row 5/00 and column P12; and FIG. 11 is a table illustrating the difference between tables 9 and 10, which represents correlation data of each cell to the value of the cell in row 5/00 and column P12.

DETAILED DESCRIPTION OF THE PREFERRED EMBODIMENTS

Figure 1:
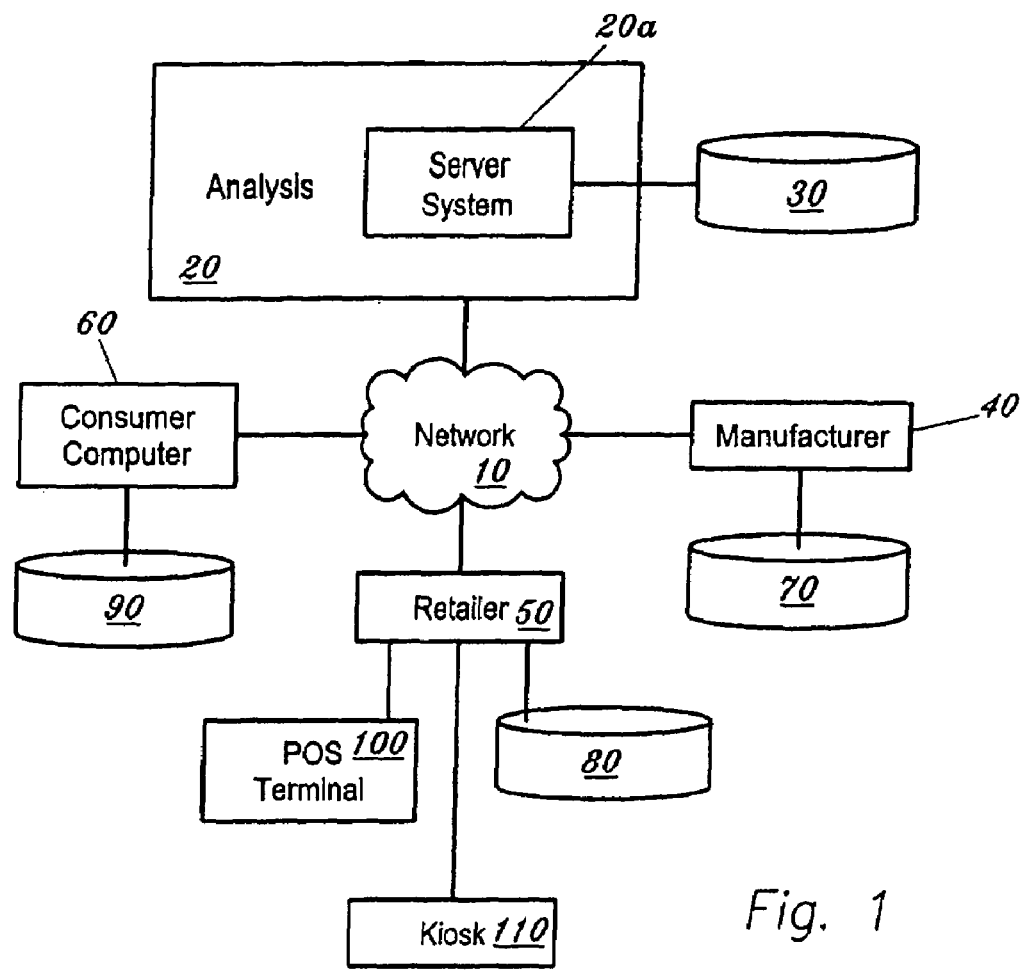
FIG. 1 is a schematic of a computer network system.

FIG. 1 shows a computer network system including network 10 preferably the Internet), analysis computer system 20 including server system 20a, database 30, manufacturer computer system 40, retailer computer system 50, consumer computer 60, databases 70, 80, 90, point of sale (POS) terminal 100, and kiosk 110. The lines connecting elements in FIG. 1 indicate a means for data transmission including wire and wireless transmission hardware, data format, and transmission protocols. Each computer system includes at least one digital computer including associated central processing unit, memory, input, and output devices.

Data stored preferably in database 30, but which may be stored in any one of databases 30, 70, and 80 includes at least one of purchase transactions data, redemption transactions data, reservations transactions data, demographics data, and loyalty quotient data in association with a consumer identification.

Preferably, the transactions data for each transaction is stored in association with a date of the corresponding transaction. Redemptions transaction data may be stored with more than one date: the date of the transaction and the date or dates of the reservation. Redemption transactions data may be stored in association with more than one date including the date of the redemption transaction and the date upon which the incentive transaction resulting in the redemption was offered. Demographics data and loyalty quotient data may also be stored in association with at least one date, such as the date upon which the demographics data was received or the date on which the loyalty quotient was calculated. Demographics data and loyalty quotient data may also be stored in association with another date or date range representing the date range over which data resulting in the demographic data or loyalty quotient data was received.

All data received in step 20 relating to a particular consumer identification (CID) is stored in the database in association with that CID. The database may be formatted as flat files or as one or more relational database files and may include tables, forms, queries, relations, reports, modules, and other objects useful in database management and programming. For convenience, the data analysis will be described below in the context of consumer records in which each record includes a field for CID (or CID in combination with store ID) and a large number of associated fields. However, it will be apparent to those skilled in database programming that the relations between the data may be otherwise than as specifically described, for example, by having data stored in third normal form.

The exemplary data format comprises a table with transaction records in which each record includes fields for CID, store ID, dates of purchase, identification of products, services, and reservations purchased in association with the date of purchase, identification of transaction incentives offered including terms of the offering in association with the date of offering and dates of redemption of each transaction incentive. Each record may also include time of day of transaction, day of week of transaction, day of month of transaction, form of payment (such as credit card, cash, check). Each transaction record may include a currency amount of each product item, transaction total currency amount, currency amount of redemptions, incentive amount of offered transaction incentives, incentive amount associated with product item, frequent shopper ID, amount of purchase less discounts and incentives, manufacturer identifications associated with products for which each incentive was offered or redeemed. Each transaction record may use a universal product code (UPC) as the identifier of a product, service, reservation.

Preferably, there is one record per customer either per transaction, per transaction date, or per date range.

The database may also store in association with a CID demographic data including age, gender, income, household income, location of residence, location of work, postal code, family size, number of children, marital status, gender, type of commuting vehicle, length of commute, type of job.

The database may also store in association with a CID block data identification. The database may also store in association with the CID or the block data identification block data, which is data indicating statistical averages for transactions and other data for consumers that live in a specified block group.

The database may also store, in association with a CID, fields derived from data, such as fields derived from demographic data for the customer, block data for the block to which the customer belongs, and loyalty quotient data for the customer's loyalty to a store, brand, or any class of transactions. These derived fields may contain data representing likelihood of a consumer purchasing in a specified class, at a specified store, or in a store of a specified retail chain.

Derived fields also include fields for frequency of specified classes of transactions, including purchases, redemption, and reservations, such as for specified products, over a specified time period.

Preferably, analysis system 20 is either hard wired or programmed to perform the algorithms disclosed herein for predictive modeling, and the applications of models to rank, determine probabilities, or make predictions. However, retailer computer system 50 or manufacturer computer system 40 may be programmed to perform those functions.

Figure 2:
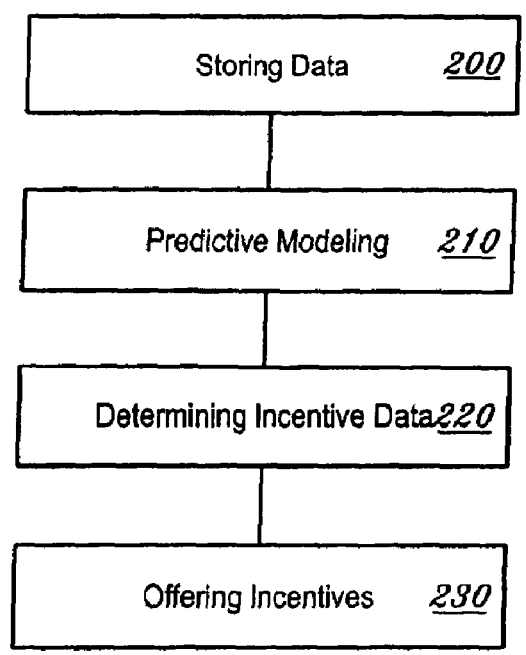
FIG. 2 is high level flow chart.

FIG. 2 shows step 200 of storing data, step 210 of predictive modeling, step 220 of determining incentive data and step 230 of offering incentives.

In step 200 a database, such as database 30, receives and stores consumer related data. Alternatively, any one of databases 70 and 80 may receive and store consumer related data for performing the following steps.

In step 210, system 20 runs software or implements in hardware a form of predictive modeling to analyze a set of data for multiple CID records in database 30. The predictive modeling identifies correlations between the existence of transactions in one or more classes of transactions in one or more time period and the existence of transactions in one or more transaction classes (hereinafter the correlated class) in at least one subsequent time period (hereinafter the correlated time period). The predictive modeling may also include other correlations, such as correlations based upon a consumer's demographic, block data, and loyalty quotients.

Generally, speaking, the predictive modeling applies the statistical correlations to any consumer's transaction data to predict what transaction behavior that consumer is likely to enter into in the correlated time period. The model may generate a probability, a prediction, and it may rank the relative likelihoods of each member of a set of consumers entering into a class of transactions.

For example, in step 210, system 20 may determine the probability that a CID (that is, people or households associated with the CID) that had no purchases of coffee associated with it will purchase coffee in the next month. In step 210, system 20 may rank CIDs not previously associated with purchase of coffee according to their probability of purchasing coffee in the next month. As another example, system 20 may rank households that had previously purchased coffee by their probability of not purchasing coffee in the next month (lapsing). As another example, in step 210, system 20 may determine the probability of a CID not purchasing at a retail store in the next month.

In step 220, system 20 determines incentive data for CIDs, in which the determination is based at least in part upon the rankings generated in step 210.

In step 230, system 20 takes action that will ultimately provide the transaction incentive to the consumer. This includes saving the data in a file for displaying or printing in human readable form, transmitting the data to a POS computer system, an Internet web site, an email address associated with the CID, or a postal mailing facility. Data defining a transaction incentive for a consumer may be provided to the consumer via email, at Kiosk 110 upon the consumer being identified by the Kiosk, at a POS terminal when the consumer's CID is associated with a transaction at that terminal, or postal mailed to the consumer's postal address associated with the CID.

Figure 3A:
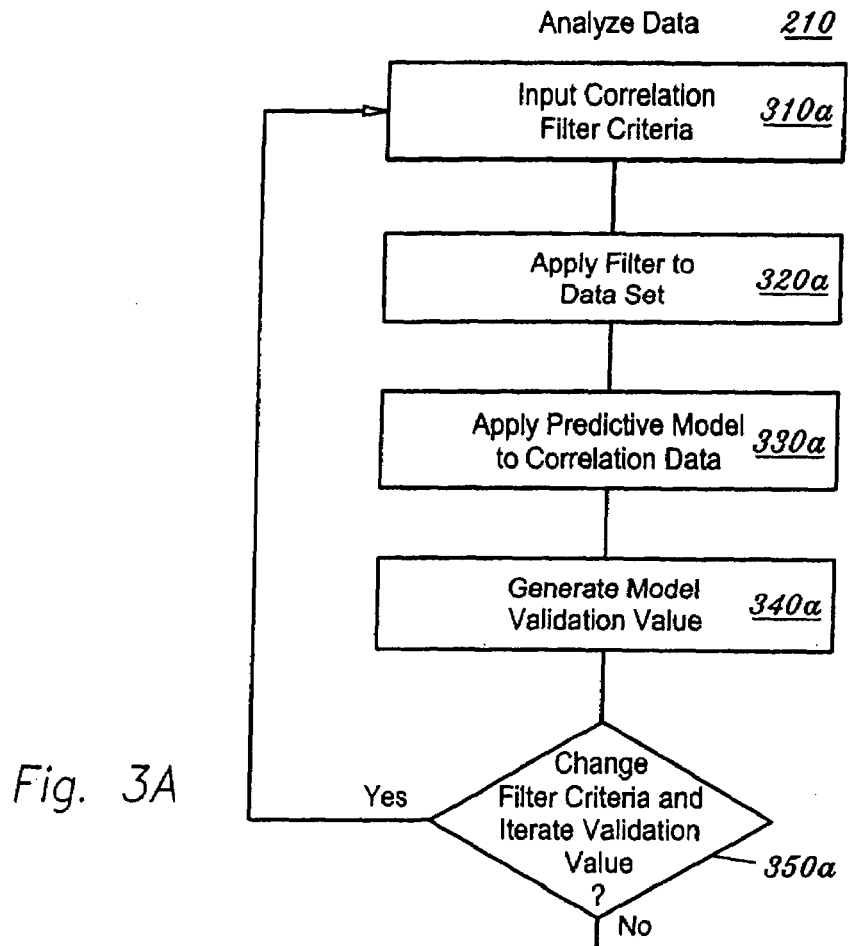
FIG. 3A is an intermediate level flow chart of step 210 in FIG. 2.

FIG. 3A shows steps relating to step 210 that system 20 may implement in determining a probability of a particular consumer changing a particular class of transactions behavior in a specified class. The specified class and the correlated time period are represented by a specified data field.

In step 310a, system 20 receives input filter criteria. Input filter criteria are criteria that are values for or depend upon statistical correlations of input fields for data associated with consumers to the data for the specified data field. The input fields are fields that store data for transactions occurring in one or more time periods prior to the correlated time period.

Examples of filter criteria depend upon the specific predictive model. However, an example of filter criteria is criteria specifying the 1, 3, 5, or 10 fields most highly correlated to the specified data field. Another example of filter criteria is all fields having a value for correlation to the specified data field of greater than one of 0.6, 0.7, 0.8, or 0.9. Another example of filter criteria is all fields having a correlation to the specified data field of greater than 0.6 and which are fields associated with transactions from a different class than the specified class.

In step 320a, system 20 applies the input filter criteria to a set of records in order to determine which fields meet the criteria. The data fields that meet the criteria are the data fields used in subsequent steps involving the transaction data. System 20 applies the input filter function using the input filter criteria to a set of data records from database 30 to define a subset of data fields in the records. Preferably, the set of records is large enough so that the results of the predictive modeling are statistically significant. This means that at least about 50 records, preferably at least 100 records, and typically 500 to 20,000 records are included in each predictive model.

The input correlation filter criteria preferably includes at least one cross-correlation value between a field other than the specified data field and the specified data field. A cross-correlation means a value for correlation between the specified data field and other data fields in the CID record, for a set of CID records. Number of cross-correlations means a number, examples being 2, 4, 10, 20, 50, and 100 of cross-correlations defined by different sets of two data fields, one of which is preferably the specified data field. The input filter function ranks the cross-correlations to the specified data field of other data fields, and limits the input fields for step 330a to those data fields most highly statistically correlated to the specified data field.

The input filter function is applied only because current digital computer systems are in practice not currently powerful enough to implement the remaining steps of FIG. 2, given a very large number of input fields, such as the several thousand product specific transaction classes defined by individual UPC codes. The filtering steps are therefore optional and may not be practiced when sufficiently powerful digital computers become available. Moreover, instead of automated filtering, a user may select which fields to use for correlation in the following step.

The specified data field is preferably a data field whose data indicates quantity of transactions in the specified class in the correlated time period. However, the specified data field may also be a field whose data indicates a ratio of quantity of transactions in the specified class in the later time period (correlated time period) to quantity of transactions in the specified class in one of the earlier time periods. Quantity in this sense may be measured by number of items, volume of items, cost paid for items, or any other means to measure quantity.

In step 330a, system 20 applies a predictive modeling algorithm to the input data fields defined in the filtering step. The predictive modeling algorithm is designed to result in a function that can be applied to a consumer record to generate a value. The value obtained by applying the predictive modeling algorithm to a record for a consumer is a rank, probability, or prediction that the actions of the consumer in the correlated time period will result in data in the specified field. For example, the predictive model algorithm may assume a predetermined functional form, then determine cross correlations of the input data fields to the correlated data field, and then set coefficients in the predetermined functional form to certain values based upon the values of the correlations that were obtained between the input data fields and the specified data field.

The covariance, C, of two variables, A and B, is defined as the expected value of their product $E\{AB\}$ minus the product of their expected values $E\{A\}E\{B\}$. $C=E\{AB\}-E\{A\}E\{B\}$. The correlation coefficient r of the variables A and B is by definition: $r=C/\sigma(A)\sigma(B)$. Two variables A and B are uncorrelated if their covariance is zero. The correlation coefficient or the covariance may be used as the measure of the correlation between the target product or class and the input data fields.

The predictive model function is a function of the values of a consumer's transactions in specified classes corresponding to the input data fields. Those classes are the classes which were the inputs to the predictive modeling used to derive the correlations used in defining the predictive model function for the specified class.

Preferably, the predictive model algorithm's predetermined functional form also includes as input variables certain demographic variables, loyalty quotient variables, and block data variables. In this alternative, the resulting predictive model function also depends upon the data values in a consumer record for the corresponding certain demographic fields, loyalty quotient fields, and block data fields. In this alternative, the value of the predictive model function reflects the likelihood of the consumer performing the specified transaction in the correlated time period, including the impact on that likelihood due to demographic data, loyalty quotient date, and block data in the consumer's record.

In step 340a, system 20 applies the predictive model function defined in step 330a to a set of consumer data records. The predictive model function generates data stored in association with each CID. The generated data is preferably a ranking probability value, or prediction, Ps (predicting data), for the consumer transaction in class S for that CID in the correlated time period. The predicting data may be stored to indicate probability or prediction of purchase in the specified claims by the consumer having the specified CID in the correlated future time period. The correlated time period is typically the next week, next month, next six weeks, or next three month period compared to the most recent time period associated with data in the input data fields. However, the correlated time period may be a discontinuous time period from the time period representing the transaction dates for data in the database, such the following week, month, or quarter. The predicting data may store data indicating a probability of reduction or increase in quantity of transaction in the specified class in the correlated time period, such as the next week, month, or quarter.

Typically, one set of data records is used in steps 310a to 330a in order to define the predictive model function. Then the predictive model function is applied to a different set of records in step 340a to generate rankings, probabilities, and predictions for a correlated time period corresponding to a future time period for use in making decisions regarding transaction incentives to offer to the corresponding consumers.

Alternatively, the predictive model function may also be applied to the different set of consumer records in step 340a to generate rankings, probabilities, and predictions for a correlated time period, but wherein the correlated time period is for a historical time period in which there is actual transaction data in the set of records. In this alternative, the rankings, probabilities, or predictions for the correlated time period may be compared to the actual transaction data for the correlated time period to determine how closely the predictions match actual data. This comparison may be used to generate a predictive model function validation value for the specific predictive model function.

In step 350a, system 20 may automatically compare the predictive model function validation value to a predetermined value (such as the results of prior predictive model function validation values for models predicting the same specified data field) to determine whether to return to step 310a. If the system 30 returns to step 310a, it automatically obtains a different set of input filter criteria based upon predetermined programmed parameters and then repeats steps 320a to 350a. Alternatively, the decisional step 350a may be user controlled, in which case system 20 waits for user instructions once completing step 340a.

When decisional step 350a does not loop back to step 310a, processing proceeds to step 220 of FIG. 2. Typically, processing will only proceed to 220 when the correlated time period is a future time period.

Steps 340a and 350a enable feedback on the effect of the form or the coefficients of the predictive model function. Thus, system 20 may store in code alternative functional forms which in addition to filter criteria may change between iterations of cycle 310a, 320a, 330a, 340a, and 350a. System 20 may store a plurality of validation values in association with, their predictive model functions for the specified data field, and may store validations values in association with their predictive model functions for a plurality of specified data fields. Preferably, prior to proceeding to step 220, system 20 has determined the predictive model function providing the largest validation value for each specified data field and calculated and stored the corresponding ranking, probability or prediction data for each specified data field.

Preferably, a predictive model is generated using a relatively small subset of all CID records stored in a database, for computational efficiency. However, the predictive model function or functions derived from the algorithm of FIG. 3a may subsequently be applied to any subset or all CID records stored in database 30. Preferably, the predictive values, Ps, are determined for a large number of CID records in database 30 and of course each Ps is stored in a field associated with the corresponding CID.

Figure 3B:
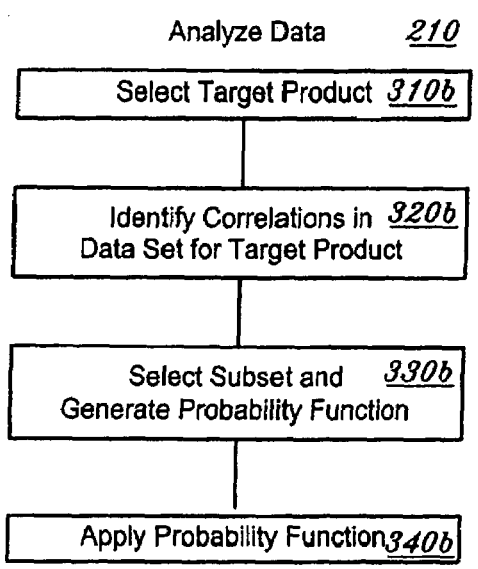
FIG. 3B is an intermediate level flow chart of step 210 in FIG. 2.
Figure 3C:
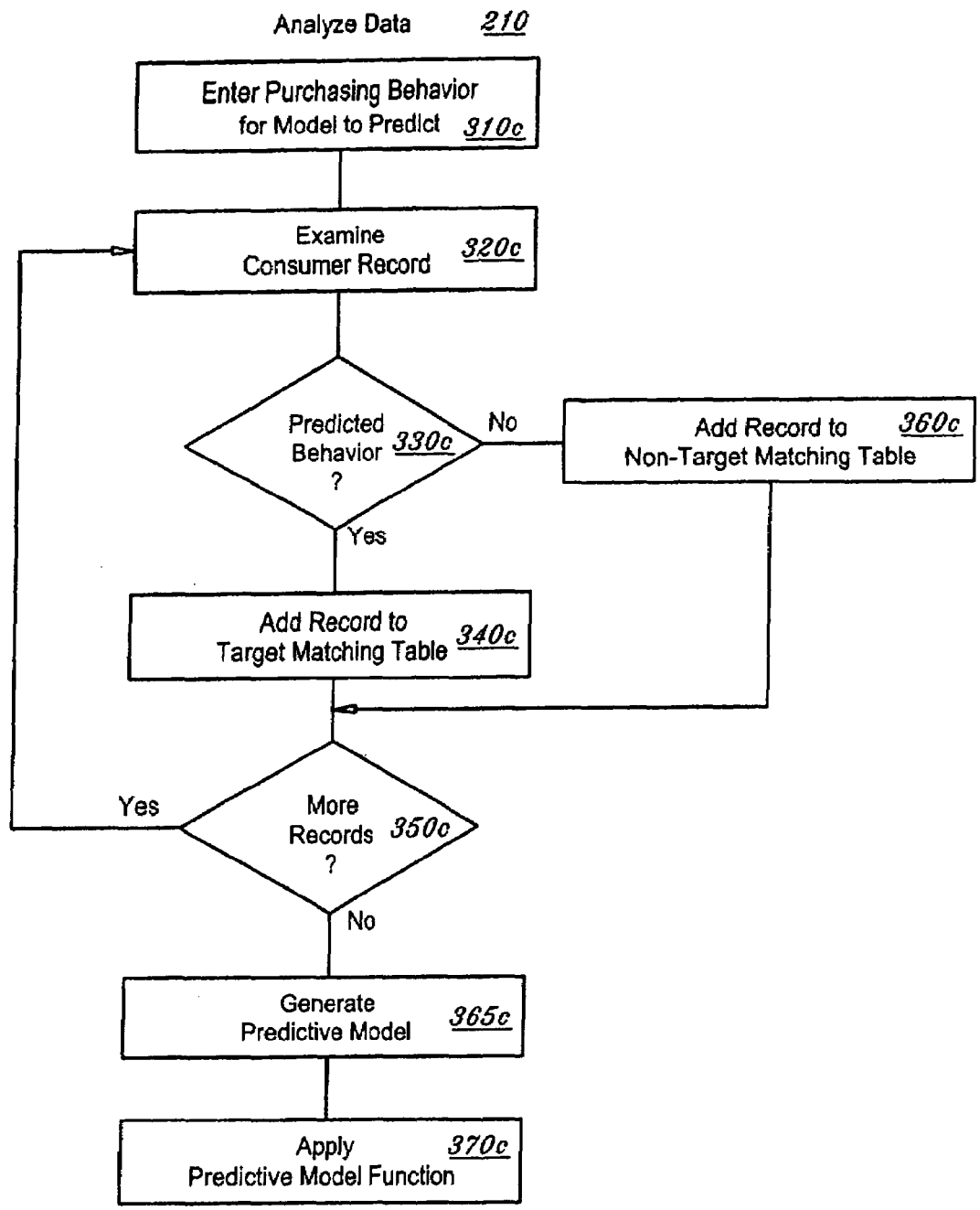
FIG. 3C is an intermediate level flow chart of step 210 in FIG. 2.

FIGS. 3B and 3C also show slightly different algorithms corresponding to step 210.

In step 310b, system 20 (or a user) selects a target product or product class. The specified product or class is one for which a prediction will be generated as to the probability a consumer will change purchase behavior. For example, the target could be a product class, such as breakfast foods; a product type, such as cereal; a product brand, such as Kellogg's cereal; a specific product, such as Kellogg's Corn Flakes; or a specific product size, such as a 16 ounce box of Kellogg's Corn Flakes.

As in FIG. 3A, the transactions data could be any measure of the consumer's purchase behavior, such as frequency of purchase, dollar value of purchase, item count of purchase, frequency of redemption of incentives, value of redeemable incentive, relative amount of incentives redeemed in different classes, price elasticity, or a measure of responsiveness to advertisements or marketing such as measure of redemption of coupons, use of vouchers, or request for rebates.

In step 320b, system 20 determines whether a correlation exists between purchase data for a target product in a correlated later time period and the other data in fields in a set of consumer transaction records in database 30 corresponding to transactions in an earlier time period.

System 20 may determine a correlation coefficient for a variable, A, that is a measure of behavior in a later time period for a specified or target product with purchase in an earlier time period of a non-specified product (or other recorded transaction activity).

System 20 may determine correlations of A with a set of variables Bi for i=1 to n where each Bi is a measure of the number of a non-target product item or volume of purchase of a non-target product item in the earlier time period.

In step 330b, system 20 selects a subset of variables, B, providing relatively high correlations with the targeted product based on the results of step 320b. For example, assume system 20 is predicting which households will be purchasing cereal during the following month. System 20 identified a correlation between the target product of cereal and five variables: B1, B2, B3, B4, and B5, which are measures of monthly purchases of more than three gallons of milk, monthly purchases of at least three loaves of bread, the presence of two or more children under the age of 15 in the household, a monthly grocery bill exceeding 350 dollars, and the absence of purchase of Kellogg's Pop Tarts during a one-month period, respectively. In step 330b, system 20 selects this subset of 5 variables to include in a predictive model. In step 330b, system 20 defines a predictive model based upon the number of variables selected and the correlations of each one of those variables with the target product. For example, the predictive model may set the probability Ps that a consumer will purchase the target product in a future time period to a normalized set of values for the sum $a1*B1+a2*B2+a3*B3+a4*B4+a5*B5$ in which the weighting coefficients a1 to a5 in the linear combination are proportional to the corresponding correlation coefficients between the B data fields and the data for the specified product in the correlated time period. Given this predictive model function, for example, if the target is the class of cereal, system 20 may predict a high probability of reduced purchase of cereal, or a low probability of purchase of cereal, for a CID record which indicates purchases of more than three gallons of milk in the last month, purchases of more than three loaves of bread in the last month, existence of three children in the household, household grocery expenditures of at least $350 in the last month, and information that the household did not purchase Kellogg's Pop Tarts during the one-month period. Depending upon the correlations and the resulting probability function, the high probability of reduced purchase of cereal, or a low probability of purchase of cereal could both be inverted.

In step 340b, system 20 applies the probability function to the subset of variables included in step 330b in a probability function to obtain a value that will indicate either the probability that a consumer will purchase the target product in a specified future time period or the probability that the consumer will change purchase behavior for the target product.

In step 310c, the target product or purchasing behavior that the model is to predict is entered into system 20. That is, either a data field, set of data fields, or function of one or a set of data fields in CID records is specified to system 20.

In step 320c, system 20 examines a certain set of CID records in database 30.

In step 330c, system 20 checks each record in the set to ascertain which consumer records show the presence of the predicted behavior. If the predicted behavior is present in the customer record, system 20 performs step 340c. If the consumer record does not meet the predicted behavior, system 20 performs step 360c.

In step 340c, if the consumer record meets the predicted behavior, system 20 adds the consumer record to a target matching database table.

In step 350c, system 20 checks to see if there are additional consumer records to access. If there are additional consumer records to access, system 20 performs step 320c. If there are no more consumer records to access, system 20 performs step 365c.

In step 360c, the consumer record does not meet the predicted behavior and system 20 adds the consumer record to a non-target matching table in database 30.

In step 365c, system 20 determines correlations between the targeted purchasing behavior and the non-targeted data fields. The correlations are discernable by comparing the mean value for each non-targeted product in the target matching database to the mean value for that non-targeted product in the non-target matching database. A significant difference in the mean values indicates that a correlation exists between non-targeted data field and the targeted purchasing behavior. The larger the difference in mean values, the larger the correlation. System 20 can define a predictive model as discussed for FIGS. 3A and 3B based upon the values of the correlations between the non-targeted products and targeted purchasing behavior.

In step 370c, system 20 reads a customer record from database 30 and applies the predictive model to determine probability of the targeted purchasing behavior occurring.

In one embodiment, the generation and storing of ranking, probability, or prediction criteria is bypassed. In this embodiment, incentive decisions are made by determining whether certain data exists in the customer's transaction record, wherein the certain data are in fields found to be highly correlated to the specified class or specified transaction data. In this embodiment, a decision whether to offer a transaction incentive for a transaction in the correlated time period in the specified class depends upon the existence of the predetermined pattern of transactions found to be correlated to the specified data field. This pattern matching based decisional process has the advantage of avoiding the complexity of storing intermediate data, namely the ranking, probability, or prediction data for each customer.

Figure 4:
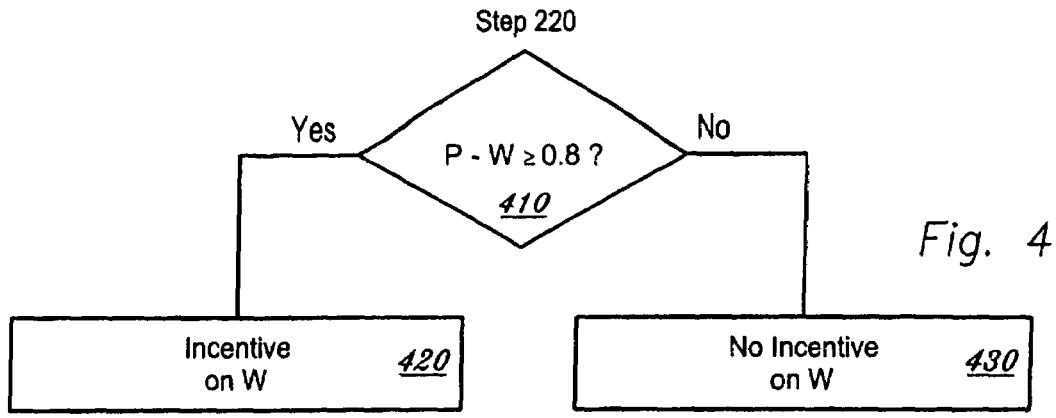
FIG. 4 is an intermediate level flow chart of step 220 in FIG. 2.

FIG. 4 shows steps relating to one example of step 220, determining transaction incentives from predictions obtained from a predictive model function. In step 410, system 20 determines whether the probability that a consumer (i.e., a consumer or household associated with a CID) who has purchased W will cease purchasing W (indicated by the subscript "–W") and decides based upon that probability whether to offer an incentive to that consumer for purchase of W. As shown, if the probability of the consumer changing his or her purchase behavior to stop purchasing W is greater than or equal to 0.8, system 20 decides to implement step 420 and provide an incentive on purchase of W to the consumer. The value of the incentive may depend upon the value of the probability. If the probability is less than 0.8, system 20 implements step 430 and decides not to offer the consumer an incentive for purchase of W.

Figure 5:
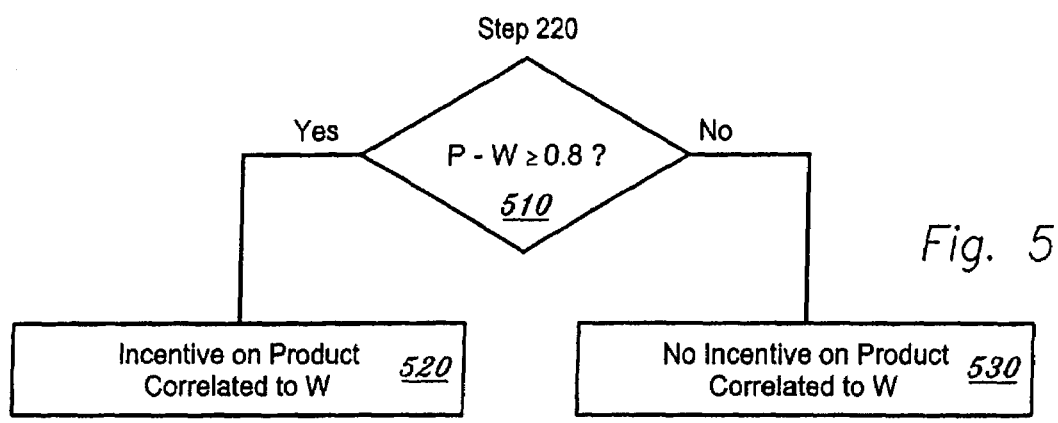
FIG. 5 is another intermediate level flow chart of step 220 in FIG. 2.

FIG. 5 also shows steps relating to step 220. In step 510, system 20 determines the probability that a consumer (i.e., a consumer or household associated with a CID) who has purchased W will cease purchasing W, and decides based upon that probability whether to offer an incentive to that consumer for purchase of a product correlated to W. As shown, if the probability of the consumer changing his or her purchase behavior to stop purchasing W is greater than or equal to 0.8, system 20 decides to implement step 520 and provide an incentive for purchase of a product correlated to W to the consumer. The value of the incentive may depend upon the value of the probability. If the probability is less than 0.8, system 20 implements step 530 and decides not to offer the consumer an incentive for the purchase of W.

Figure 6:
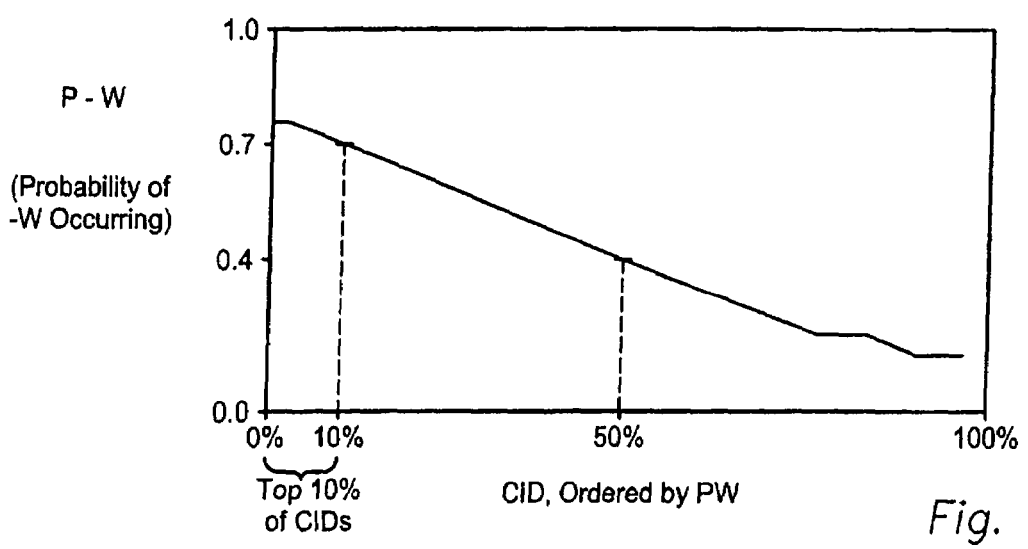
FIG. 6 is a graph relating to probability outputs of the model.

FIG. 6 shows CID records ordered by probability, from highest to lowest probability extending along the X axis. FIG. 6 shows the percent of CIDs (from 0%, 10%, 50%, 100%) on the X axis having the probability shown on the Y axis. Here, probability means the probability for a CID having data in the specified data field.

In optional step 350a, filter criteria are changed, and the process of steps 310a-340a are repeated based upon the new criteria. The change may be programmatically implemented based upon programmed criteria or manually implemented by commands entered by a user via an input/output device.

FIG. 6 shows a ranking of consumers by probability of consumers changing from previously purchasing product W to not purchasing product W (indicated by "–W"). As shown, 10% of CIDs have a probability of greater than 0.7. These consumers may be ideal candidates for an incentive. The consumers whose CIDs are represented on the X axis by the 50% to 100% range are shown having probabilities of changing purchase behavior on W of less than about 0.4. This means that one half of all consumers having CID records in the system are determined to have less than about 0.4 probability of ceasing their purchases of W.

FIGS. 4-6 relate to predicting the probability of a consumer changing behavior from purchasing a product in one time period to not purchasing that product in a subsequent time period. In those cases, one marketing possibility is to target market consumers having a high such probability. Alternatively, the system and method disclosed herein may be used to determine consumers that have not previously purchased W who will start purchasing W. Decisions on incentives to those consumers for W and for products correlated to purchase of W may be made depending upon this probability.

System 20 could decide whether to issue an incentive offer based solely on a score generated by the model for a target product. The system could also decide to issue different incentive offers based on score. Examples of different incentive offers include free target products; discounts on the target product, offers on a different brand in the same class as the target product, offers on a product complimentary to the target product; and discounts on purchases of multiple packages of the target product. Complementary products are those products often used in conjunction with one another, such as milk and cereal, or cheese and crackers, or reservations for flights and reservations for hotels.

In addition, an incentive program could be part of a marketing campaign or as a method of generating further information on the purchasing habits of consumers to help improve accuracy of system 20's predictive modeling.

In addition to recognizing the presence or absence of a product, system 20 may be programmed to account for the consumer's changes in purchase level for specific products. For example, a consumer purchased eight gallons of milk in February/March but only four gallons in April/May. System 20 could use milk purchase data for both prior time periods to account for tendencies that are common to the population as a whole. For example, people may not drink as much milk when it is hot outside. System 20 could use milk purchase data to account for tendencies that are specific to the consumer. For example, system 20 may determine from records based on at least one of the consumer's airline tickets, hotel records, and grocery purchase records from a location distant from the customer's normal place of purchase that the consumer had been out of town for a certain time period.

Detailed examples of algorithms for performing the invention follow in order to explain aspects of the invention and identify types of transaction incentives applicable to the results of the predictive modeling.

First, obtain a consumer transaction database containing transaction data for a first set of consumers. This transaction database may also include demographic data. In this example, the database contains transactions for classes P1, . . . P12. P1, . . . P12 may each represent the products having the same Universal Product Code (UPC), or any class of products sharing a common attribute as previously discussed.

Second, cumulate the transactions records for each consumer by time period, such as by month. That is, identify the number of item or services purchased in association with a consumer identification within each one of classes P1, . . . P12, in each month. Tables 1 and 2 illustrate this step.

In FIG. 7, table 1 shows a customer's transactions in association with dates of transaction for transaction classes P1 to P12. Each row in table 1 represents a transaction and specifies the date of the transaction and the quantity of items transacted in each class.

In FIG. 8, table 2 shows the cumulation of quantity of items transacted in classes P1 to P12 by time period. More specifically, table 2 shows the cumulation of transaction data for customer 1 in each one of months of January through May of the year 2000 (1/00 to 5/00). Alternatively, place a 1 in the cells in table 2 for any month and Pi in which the consumer has purchased at least one item.

Second, for each class Pi and each one of the time periods, calculate the fraction of the consumer records of the first set of consumers having a non-zero value.

In FIG. 9, table 3 graphically illustrates the result of the second step.

Third, identify a first subset of cumulated transaction history records for consumers of the first set that purchased at least 1 item in class P12 in time period 5/00. That is, filter from the larger set of records a sub set in which the fraction for P12 is 1. That is, include in the first subset only customer transaction records that have a non-zero value for transactions of class P12 in time period 5/00.

Fourth, repeat the second step on the first subset. That is, for each class Pi and each one of the time periods in the first subset, calculate the fraction of consumer records having a non-zero value.

In FIG. 10, table 4 graphically illustrates the result of the fourth step.

Fifth, subtract the values in cells in Table 3 from the values in the corresponding cell in Table 4.

In FIG. 11, table 5 illustrates the result of the fifth step. Table 5 shows values in each cell that are representative of correlations to the existence of transactions in P12 in time period 5/00. A positive value in table 5 indicates purchase in the corresponding class correlates to purchase of P12 in time 5/00, with the magnitude of the value indicating the degree of correlation. A negative value in Table 5 indicates failure to purchase in the corresponding class predicts purchase of P12 in time 5/00, with magnitude of the value indicating the degree of correlation.

Alternatively, instead of correlating to a fraction representing the existence or lack of existence of a transaction in each cell in table 5, steps 1 to 4 could have been modified so that table 5 correlated to the average number of items purchased. That is, tables 3 and 4 could have been determined by calculating the average number of items transacted instead of the fraction of the consumer records having non-zero values. In that case, the cells in table 5 would contain numbers indicating an average difference in number of items purchased for those in the first subset compared to the average number of items purchased for those in the first set. Use of data in this alternative would require subtracting the average values determined for the first set of consumers from the actual transaction data for a specific consumer, and then determining whether the result of that subtraction correlated to the alternative table 5 data. This additional step is not necessary when using the correlation data shown in table 5, as explained below.

The correlation data shown in table 5 may be used in many ways to estimate the likelihood or relative likelihood of a consumer transacting in class P12 in the future. Preferably, the correlation data is used by operating with it on an individual consumer transaction record to determine a likelihood of that consumer subsequently purchasing in P12 in the correlated time period, or a relative likelihood relative to other consumers, of that consumer subsequently purchasing P12 in the correlated time period.

A consumer having non-zero transactions in a class and a time period that is correlated to a future transaction in class P12 is a predictor that the consumer will subsequently conduct a transaction in P12. That prediction may be used as one factor in deciding whether and when to provide to that particular consumer a transaction incentive offer to purchase in class P12 in the correlated time period. A consumer having no transactions in any class and a time period that is correlated to a future transaction in class P12 is a predictor that the consumer will not subsequently conduct a transaction in P12 in the correlated time period. That prediction may be one factor used in deciding whether and when to offer that particular consumer an incentive to purchase in class P12. Moreover, correlations or lack thereof may be used to determine the value of any incentive transaction to offer to the consumer.

The identification of correlations and their magnitude indicated by non-zero values in table 5 may be used to combine the significance of some or all of the correlations. One method involves determining the difference in the fraction of consumers that purchase in two or more of the correlated classes identified in table 5 and subsequently purchase in class P12 in time period 5/00 (the correlated time period) to the fraction of consumers that purchase those two correlated products without regard to purchase of P12 in time period 5/00. Similarly, fractional difference correlations may easily be calculated for any combination of cells of table 5 showing a correlation. More than one such correlation value for two or more of the cells shown in table 5 may be calculated. The resulting correlations may be used individually or combined in a ranking function as discussed in the next paragraph.

Alternatively, we can derive a ranking function by defining a multi variable correlation formula applicable to the data for a consumer's transactions that cumulates the significance of each of the single class correlations shown in table 5. Applying the derived multi variable correlation formula to a second set of consumer transaction records results in values that rank each consumer record by the likelihood of the corresponding consumer purchasing in P12 in the correlated time period. An expression for an exemplary ranking function follows. Define a ranking function $R(P12, n, Sk)=R$, which defines a rank R for consumer record Sk's likelihood of transacting in class P12 in time period n. We define $R(P12, n, Sk)=\Sigma(NC_{ij}$ if $C_{ij}$ is positive $-C_{ij}$ if $CU$ is negative), where $N_{ij}$ represents the number of items transacted in class i in time period j, $\Sigma$ represents summation over values of i and j, $C_{ij}$ are the correlation values derived as indicated for table 5, and j runs from 1 to 12, or 1 to 11. In the example represented by table 5, non-zero values of $C_{ij}$ only exist for certain i values wherein $j=n-1$ (time period 4/00) or $j=n-2$ (time period 3/00). However, we recognize that correlations between more than three time periods, and non-consecutive time periods may exist, and the general form for $R(P12, n, Sk)$ accounts for these possibilities.

Any of the multi variable correlation functions applied to a set of consumer transaction records will result in a distribution of values for consumer records Sk. The records of some consumers will have relatively high R values and the records of other consumers will have relatively low R values. Relatively high values indicate a relative likelihood that the corresponding consumers will purchase in category P12 in the predicted time period. The system of the invention may use both relatively high values and anticipated time period of purchase and relatively low values as inputs in determining whether to make available to a consumer an incentive offer and when to make the incentive offer available.

Statistical analysis, heuristic, or ad hoc rules may be applied to the R function to map R values to probabilities in the range 0 to 1. The simplest method of mapping the R values for a set of consumers to a probability range is to normalize the R values by dividing all of the R values for a set of consumers by the largest R value in the set.

The results of the ranking or probability of purchase of P12 in time period 5/00, the correlated time period, may be used in decisions regarding offering of incentives in a variety of ways.

In the case of a relatively high likelihood of a consumer purchasing in class P12 in a correlated time period, one of the manufacturers competing for sales in class P12 may decide to offer the consumer a discount on their brand product in class P12, and at a time, such as a day a few days, or a week prior to the anticipated purchase time period, or during the anticipated purchase time period. If the consumer's prior purchase data shows that the consumer preferentially purchases that manufacturer's products in that class P12, the manufacturer may decide to offer no incentive or to offer only a low value incentive. If the consumer's prior purchase data shows that the consumer preferentially purchases a different manufacturer's product in class P12, the manufacturer may decide to offer a large value incentive in an attempt to induce the consumer to try its product. If the consumer's prior purchase data shows that the consumer has purchased from a variety of different manufacturer's product in class P12, the manufacturer may decide to offer an intermediate value purchase incentive in an attempt to induce the consumer to try its product. The determinations based upon consumer's preference to a different manufacturer in class P12 is an example of a class and subclass determination. The class is P12. The subclass is the brand of the manufacturer of products in P12 to which the customer's prior sales are associated.

One benefit of this invention is that it enables manufacturers and retailers to make determinations regarding incentive determinations based upon a ranking or likelihood of a consumer purchase in a class and additional data regarding the consumer's preferences or purchase history in that class or a subclass of that class. Thus, the invention provides for making decisions regarding purchase incentive offers based upon a customer's prior purchase history in (1) a class and (2) a subclass of that class and correlations to either the class or the subclass indicating likelihood of the consumer purchasing in either the class or the subclass in a correlation time period.

In the case of a relatively low likelihood of a consumer purchasing in class P12 in a correlated time period, a manufacturer may decide either to offer the consumer a relatively high value purchase incentive for purchasing in P12 or to forego offering the consumer a purchase incentive in P12.

The foregoing references to manufacturers in this example apply equally to retailers. Especially when those retailers (1) desire to increase sales by offering purchase incentives on products a consumer is unlikely to otherwise purchase, (2) introduce their own brands in their stores (house label brands) in competition with the other brands they sell in their stores, and (3) desire to motivate consumers to perform subsequent shopping transactions in stores of the same retailer rather than in stores of different retailer, such as a competing retailer.

One advantage of the invention is that it enables a determination of a correlation time period when a consumer is unlikely to purchase in a specified class, even when the consumer's purchase history shows transactions in that class in the past. This enables manufacturers and retailers to avoid the expense of generating and transmitting to consumers incentive offers that have little likelihood of being used.

The ranking and probability determinations identified above for P12 can be repeated for each one of classes P1 to P11. Manufacturers and retailers may make decisions regarding incentive offers for a consumer based upon all of that information. For example, a manufacturer may decide to offer an incentive to a consumer only for the one class in which it is most likely that the consumer will purchase in the class, and will likely purchase from another manufacturer. Alternatively, a manufacturer may decide to offer a specified number of transaction incentives to each consumer, and provide to each consumer incentives in those classes in which it is most likely that the consumer will purchase in the correlated time period, and depend the value of the incentive to each consumer upon the consumer's likelihood of purchasing from the manufacturer as determined by the consumer's prior purchase history. Alternatively, the manufacturer may decide to provide incentives only to consumers that previously have consistently purchased from that manufacturer in a class but appear unlikely to purchase in that class in the correlated time period.

Demographic data provides additional information which can be correlated to consumer's purchases in specified classes. For example, consumer demographic data may show that consumers having at least one child under the age of 12 in their household are 70 percent likely to purchase a dairy product in each shopping transaction at a supermarket, whereas consumers without at least one child in their household are only 25 percent likely to purchase at least one dairy product in each shopping transaction at a supermarket. This time independent correlation data may be combined into the foregoing ranking functions to account for this known demographic effect upon a consumers anticipated transactions in the correlated time period. For example, the R function defined above may be modified by adding a fraction corresponding to the demographic based statistical likelihood of a purchase in the target class. In that alternative, the function $R(P12, n, Sk) = \Sigma(NCij$ if $Cij$ is positive $-Cij$ if $Cij$ is negative) could be modified by adding a term $Dk$ where $D$ represents the correlation value (0.70 for a consumer who has a child under 12 and 0.25 for a consumer who does not have a child under age 12) and $k$ represents the specific consumer. Similarly, any other data providing a statistical correlation to certain consumer transactions may be included in a ranking or probability function indicating likelihood or relative likelihood of a specific consumer transacting in a class in a time correlated period. For example, a retailer loyalty quotient, $Q$, which is an estimate of the fraction of a consumer's total grocery shopping dollars spent at a certain retailer, may be included in a ranking function. For example the value of $Qk$ for consumer $k$ can be added to the definition of the ranking function such that $R(P12, n, Sk) = \Sigma(NCij$ if $Cij$ is positive $-Cij$ if $Cij$ is negative$) + Dk + Qk$.

Additional time independent consumer specific data which may be included in the ranking of consumers includes a measure of the consumer's likelihood to redeem transaction incentives that have been provided to them in various ways, such as via direct mail, email, at the point of sale, at kiosks not at the point of sale both in a retail store and out of the retail store, and transaction incentives over the Internet at web sites. The time independent data relating to the consumer's likelihood of redeeming based upon the modality of transmission of the transaction incentive to the consumer may be used in determining which modality to use in providing the transaction incentive to the consumer.

An example of a predictive model is $Ps(x1, x2, x3)$ where $Ps$ is a statistical probability of purchase of canned peas in a later time period, $x1$, $x2$, and $x3$ are measures of purchase of milk, cereal, and paper goods in a prior time period. For example, the functional form of $Ps$ may be $Ps = f1(x1) + f2(x2) + f3(x3)$ where $f1$ is a function ranging from 0 to $\frac{1}{2}$, and $f2$ and $f3$ are both functions ranging from 0 to $\frac{1}{4}$. For example of the functional form of $f1$, $f1$ may be zero if $x1$ indicates no purchase of milk in the prior time period and ranging up to $\frac{1}{2}$ with increasing quantity of milk purchased in the prior time period up to 2 gallons of milk. For example of the functional form of $f2$, $f2$ may be $\frac{1}{4}$ if $x2$ is zero, and $x2$ may decrease with increasing $x2$ until $x2$ reflects purchase of at least 5 dollars of cereal in the prior time period. For example of the functional form of $f3$, $f3$ may be zero when the value of $x$ indicates no purchase of paper goods in the prior time period, and $f3$ may range up to $\frac{1}{4}$ as the value of $x3$ may increase polynomally to indicate purchase of $20.00 in paper goods.

Another example of a predictive model is $Ps(x1, x2, x3)$ in which $Ps$ is the probability of a change in purchase behavior of the specified product in the earlier and later time periods. For example, $Ps$ may be the probability that quantity of the specified product will decrease, remain constant, or increase. $Ps$ may or may not be a function of a measure of purchase of the specified quantity in the prior time period. As a specific example, $Ps$ may be the probability of the quantity of purchase of canned peas in the second time period being no more than 50 percent the quantity of canned peas purchased in the first time period. Again, one possible predictive model is $Ps = f1(x1) + f2(x2) + f3(x3)$. Obviously, the number of variables, $x1$, $x2$, and $x3$ may vary. Preferably, the model includes at least two variables, more preferably three or more variables. The number of variables, $x$, in a predictive model of the invention may range from 2 to over 100, but preferably, in view of current digital processing limitations, is in the range of 3 to 15, more preferably 5 to 10. The functional form of $Ps$, the predictive model, may also vary greatly. However, the functional form of $Ps$ should reflect the underlying correlation of the variables $x1$, $x2$, etc with the change in purchase quantity in the earlier and later time periods of the specified product. The functional form of $Ps$ may be predetermined by the user or automatically determined by computer code generating the predictive models applicable to each specified product.

This invention will allow a company with a database containing detailed shopping records for numerous consumers to help a cold cereal manufacturer protect its sales by providing an incentive to a consumer who has purchased a specific product of that manufacturer's cereal in the recent past but might stop purchasing the cereal product (hereinafter in this example referred to as "cereal") in the future. In order to accomplish this goal, all of the consumers' purchasing records are read into a computer analysis and modeling program which uses one or a combination of regression analysis, neural network analysis, and decision tree analysis to identify characteristics in the data records that correlate with the subsequent purchase and non-purchase of cereal and to formulate a predictive model based upon the identified correlations. In formulating a prediction of a specific consumer's purchases, the modeling program relies on the predictive model generated by an analysis of statistical population of data records (CID records) applied to actual data in that specific consumer's purchasing records. The purpose of the modeling program is to examine leading indicators and determine which consumers are going to change their spending habits and in what way. For example, there may be 30 or 40 products that are highly correlated to the future purchase or non-purchase of cereal. Some of the products could be complimentary products, such as milk, bananas, or sugar. Other products might be competing products, such as oatmeal, instant breakfast drinks, muffins, or a competitor's brand of cereal. Still other products might be considered which would appear to have no prior or readily discernable rational reason for correlation to the sale of cold cereal, such as Pez candy or nail polish. The prior purchase of cereal, the target class, may or may not be one of the variables that comprises the model.

In addition to products, modeling may use a wide variety of demographic data to develop correlations based on indication of a change in lifestyle. Some demographic reasons a consumer would alter the consumer's consumption of cereal include: an only-child graduating high school and leaving the household (decreased demand compared to the same household) or the presence of a large number of children under the age of 15 in a household (increased demand for cereal compared to the average household). Note that the preceding two examples that the model can accommodate are comparisons between the household at two different times (the child going away to college) and a comparison between the household and other households generally (the household with a large number of children under the age of 15). Lifestyle factors may also be included in the analysis, such as a job change necessitating a longer commute which did not allow the consumer time to sit down and eat breakfast, the consumer may have started a fad diet that consisted only of meat (eliminating cereal from the foods consumers would eat), or the consumer's refrigerator may have broken and the consumer was unable to keep cold milk in the home. Other factors that may indicate that the consumer might stop purchasing cereal are related to the consumer's shopping habits. If the consumer constantly changed the type of cereal the consumer purchased, it might indicate the consumer did not find a type of cereal to the consumer's liking and would make the consumer more likely to stop purchasing cereal than a consumer that habitually bought a certain brand and product. Such a non-loyal consumer is a prime target for an incentive for cereal. A decline in the consumer's frequency of purchasing cereal or a decrease in the size of the cereal box purchased, or an increase in the price of cereal might forestall a future decline in the consumer's cereal purchases.

In addition to identifying products which correlate to the non-purchase of cereal, system 20's analysis formulates the relative weighting of each variable and the relevant time period or time periods that provide improved relatively larger correlations. System 20 may be programmed to evaluate purchases from two or more prior time periods and from time periods of different durations in generating a predictive model. Alternatively, system 20 may be limited to a program based on only two time periods of equal duration. For example, system 20 might predictively model consumer behavior from each one of a subsequent 6 months based upon consumer transaction information for the month of September.

As stated above, all of the variables can be derived by the computer program based on a combination of regression analysis, neural network analysis, and decision tree analysis. However, if the user chooses, any variable may be established by the user.

In a preferred embodiment, after system 20 defined the predictive model function, it applies the predictive model function to a CID record for each consumer in a set of consumers resulting in a score for each CID record for the targeted behavior. The score is preferably then compared to a value to determine if the consumer associated with the CID will receive an incentive. For example, the model for the cereal incentive program introduced above might contain the following product variables: the purchase of milk, napkins, limes, 35 millimeter film, bananas, frozen pizza, oatmeal, sugar, coffee, tissues, and canned corn; as well as the following demographic data: household income and number of children under the age of 16. Each variable is evaluated to a number. The values of the numbers may be discrete (for example, a "one" for the purchase of the product during the applicable period and a "zero" for the absence of a purchase of the product during the relevant time) or continuous. These values may be summed to produce a score for each CID. The score need not be an estimate of probability, per se. The model could equate a percentile to a score (for example, a score of seven indicates that seventy percent of the consumers will purchase cereal during the relevant period and a score of eight might indicate that eighty-five percent of the consumers will purchase cereal during the relevant period). This would enhance decision making regarding which consumers to provide an incentive to, for which product, and how enticing the incentive will be. The focus of the scoring could also be to indicate that the consumer was about to stop purchasing cereal, that the consumer was about to purchase less cereal, the consumer was about to purchase a different brand of cereal, and that the consumer was going to purchase a hot cereal instead of a cold cereal.

My invention is not limited to the specific example above. It is more properly defined by the scope of protection I claim in the following claims.

I claim:

1. A system, comprising:
  a database;
  a computer system having read and write access to said database; and
  wherein said database stores a first plurality of records including a first record for a first consumer;
  wherein said first record stores:
  (1) CID data (consumer identification data) indicating a first consumer CID for said first consumer;
  (2) transaction data in a set of transaction class fields indicating items transacted by said first consumer during a first prior time period, including a first transaction class field indicating items transacted by said first consumer in a first transaction class during said first prior time period;
  (3) first correlated class predictive data in a first correlated class predictive data field indicating at least one of a ranking, a probability, and a prediction that said first consumer will transact in a first correlated class during a correlated time period, and wherein said correlated time period is subsequent in time to said first prior time period;
  wherein said computer system stores data defining a predictive model function, said predictive model function is defined at least in part by values representing statistical correlations between the existence of transactions in at least one transaction class for transactions that occurred during at least one second prior time period and transactions in at least one transaction class that occurred during at least one third time period, wherein said at least one third time period is subsequent in time to said at least one second time period, said statistical correlations derived from a second plurality of consumer records; and
  wherein said computer system is structured to (1) apply said predictive model function to transaction data in said first record for transactions in said first record that occurred during said first prior time period, to result in said first correlated class predictive data and (2) store said first correlated class predictive data in said first correlated class predictive data field of said first record.

2. The system of claim 1 wherein said statistical correlations include no cross-correlations.

3. The system of claim 1 wherein said statistical correlations include cross-correlations.

4. The system of claim 1 wherein said first record stores transaction data in a second transaction class field indicating items transacted by said first consumer in a second transaction class during said first prior time period, and wherein said first transaction class is distinct from said second transaction class.

5. The system of claim 1 wherein said first record stores transaction data in a second transaction class field indicating items transacted by said first consumer in a second transaction class during said first prior time period, and wherein said first transaction class is a genus and said second transaction class is a species of said genus.

6. The system of claim 1 wherein said database stores, in association with said first consumer CID, transaction data in a second transaction class field indicating items transacted by said first consumer in a second transaction class during said first prior time period, and wherein said first transaction class and said second transaction class are distinct.

7. The system of claim 6 wherein said database stores, in association with said first consumer CID, transaction data in a third transaction class field indicating items transacted by said first consumer in a third transaction class during said first prior time period, and wherein said first transaction class, said second transaction class, and said third transaction class are all distinct from one another.

8. The system of claim 7 wherein said database stores, in association with said first consumer CID, transaction data in a fourth transaction class field indicating items transacted by said first consumer in a fourth transaction class during said first prior time period, and wherein said first transaction class, said second transaction class, said third transaction class, and said fourth transaction class are all distinct from one another.

9. The system of claim 8 wherein said database stores, in association with said first consumer CID, transaction data in a fifth transaction class field indicating items transacted by said first consumer in a fifth transaction class during said first prior time period, and wherein said first transaction class, said second transaction class, said third transaction class, said fourth transaction class, and said fifth transaction class are all distinct from one another.

10. The system of claim 9 wherein said database stores, in association with said first consumer CID, transaction data in a sixth transaction class field indicating items transacted by said first consumer in a sixth transaction class during said first prior time period.

11. The system of claim 10 wherein said database stores, in association with said first consumer CID, transaction data in a seventh transaction class field indicating items transacted by said first consumer in a seventh transaction class during said first prior time period.

12. The system of claim 11 wherein said database stores, in association with said first consumer CID, transaction data in an eighth transaction class field indicating items transacted by said first consumer in an eighth transaction class during said first prior time period.

13. The system of claim 1 programmed to decide whether to offer a transaction incentive to said first consumer based upon said predictive data in said first predictive field for said first consumer.

14. The system of claim 13 wherein a term of said transaction incentive is purchase in said first correlated class.

15. The system of claim 13 wherein a term of said transaction incentive is purchase of a specified quantity in said first correlated class.

16. The system of claim 13 wherein a term of said transaction incentive is purchase of a specified brand in said first correlated class.

17. The system of claim 13 wherein terms of said transaction incentive are purchase in said first correlated class during said correlated time period.

18. The system of claim 13 wherein a term of said transaction incentive is purchase in a class other than said first correlated class.

19. The system of claim 13 wherein a term of said transaction incentive is purchase of a specified brand not in said first correlated class.

20. The system of claim 13 wherein terms of said transaction incentive are purchase in a class other than said first correlated class during said correlated time period.

21. The system of claim 1 further comprising a terminal for presenting transaction incentive to said first consumer.

22. The system of claim 1 further comprising a printer for printing terms of a transaction incentive.

23. The system of claim 22 wherein said printer is at a POS terminal.

24. The system of claim 22 wherein said printer is at a Kiosk.

25. The system of claim 22 wherein said printer is at a consumer's computer.

26. A method, comprising:
providing a database;
providing a computer system having read and write access to said database; and
storing in said database a first plurality of consumer records including a first record for a first consumer;
wherein said first record stores:
(1) CID data (consumer identification data) indicating a first consumer CID for said first consumer;
(2) transaction data in a set of transaction class fields indicating items transacted by said first consumer during a first prior time period, including a first transaction class field indicating items transacted by said first consumer in a first transaction class during said first prior time period; and
(3) first correlated class predictive data in a first correlated class predictive data field indicating at least one of a ranking, a probability, and a prediction that said first consumer will transact in a first correlated class during a correlated time period, and wherein said correlated time period is subsequent in time to said first prior time period;
said computer system storing data defining a predictive model function, wherein said predictive model function is defined at least in part by values representing statistical correlations between the existence of transactions in at least one transaction class for transactions that occurred during at least one second prior time period and transactions in at least one transaction class that occurred during at least one third time period, wherein said at least one third time period is subsequent in time to said at least one second time period, and wherein said statistical correlations are derived from a second plurality of consumer records;
said computer system applying said predictive model function to transaction data in said first record for transactions in said first record that occurred during said first prior time period, to result in said first correlated class predictive data; and
said computer system storing said first correlated class predictive data in said first correlated class predictive data field of said first record.

27. The method of claim 26 further comprising providing memory storing code to determine from a plurality of customer records said statistical correlations.

28. The method of claim 26 wherein said correlations include cross-correlations.

29. The method of claim 26 further comprising deciding whether to offer a transaction incentive to said first consumer based upon said predictive data in said first predictive field for said first consumer.

30. The method of claim 29 further comprising printing said transaction incentive.

31. The method of claim 29 wherein said printing comprises printing in the presence of said first consumer.

32. The system of claim 1 further comprising memory storing code to determine from a plurality of customer records said statistical correlations.

* * * * *

UNITED STATES PATENT AND TRADEMARK OFFICE
CERTIFICATE OF CORRECTION

| | | |
|---|---|---|
| PATENT NO. | : 7,653,594 B2 | Page 1 of 1 |
| APPLICATION NO. | : 10/297914 | |
| DATED | : January 26, 2010 | |
| INVENTOR(S) | : Davis | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1948 days.

Signed and Sealed this
Eighteenth Day of January, 2011

David J. Kappos
*Director of the United States Patent and Trademark Office*